United States Patent [19]

Lahtinen

[11] Patent Number: 4,461,700
[45] Date of Patent: Jul. 24, 1984

[54] ROTARY FEEDER

[75] Inventor: Seppo Lahtinen, Pori, Finland

[73] Assignee: A. Ahlstrom Osakeyhtio, Noormarkku, Finland

[21] Appl. No.: 345,215

[22] Filed: Feb. 3, 1982

[30] Foreign Application Priority Data

Feb. 24, 1981 [FI] Finland ................................. 810549

[51] Int. Cl.³ ............................................. B07B 4/00
[52] U.S. Cl. ............................... 209/136; 209/139 R; 209/147; 209/488; 209/497; 406/66
[58] Field of Search ................... 209/19, 20, 11, 494, 209/495, 474, 475, 476, 136–139 R, 146, 147, 454, 488, 497, 157–159, 501; 110/165 A; 406/66

[56] References Cited

U.S. PATENT DOCUMENTS

| 2,176,107 | 10/1939 | Smith | 209/158 X |
| 3,397,657 | 8/1968 | Tada | 110/165 A X |
| 4,028,231 | 6/1977 | Parham | 209/501 X |

FOREIGN PATENT DOCUMENTS

| 683165 | 6/1930 | France | 209/147 |
| 236947 | 12/1925 | United Kingdom | 209/158 |

Primary Examiner—Richard L. Chiesa
Attorney, Agent, or Firm—Bucknam and Archer

[57] ABSTRACT

A rotary feeder for simultaneous screening and discharging of material from the bottom part of a fluidized bed reactor. The rotary feeder is provided with a rotor having blades, between which pockets are formed. In the rotary feeder there is disposed an air inlet and an air outlet for accomplishing a flow of air through the pocket after it has moved over the inlet of the supply material.

5 Claims, 4 Drawing Figures

ROTARY FEEDER

The present invention relates to a rotary feeder especially suitable for discharging coarse-grained material from a fluidized bed reactor, but which can also be used for other applications in which material including fine particles is fed to a vessel or discharged therefrom so that fine particles are at the same time separated from the coarse ones.

The velocity of the gases flowing through the combustion chamber in the so called circulating fluid bed reactor is so high that they entrain so much finely-divided material that a particle suspension is formed, which extends to the upper part of the reactor and the density of which decreases towards the upper part of the reactor. Solid particles are separated from the gases discharged from the upper part of the reactor in a dust separator and are returned to the lower part of the reactor. The more coarse particles which have to be discharged continuously while the reactor is in operation, gather in the lower part of the reactor. The material removed from the reactor contains, however, also finely-divided material which can be separated therefrom and returned to the reactor. Yet the separating of the fine particles causes troubles due to the high temperature of the material discharged from the reactor, the varying amount and the particle size.

The U.S. Pat. No. 3,397,657 discloses a solution in which coarse-grained material is discharged from a fluidized bed reactor by means of an aeration pipe and in which the fine fraction is separated from the coarse one in an upright pipe disposed outside the reactor. It has, however, been noted that the separating capacity of the apparatus is not the best possible.

It is an object of the present invention to offer an apparatus for simultaneous transferring and screening of material. It is especially an object of the present invention to provide a dependable and simple apparatus by means of which coarse material can be discharged from a fluidized bed reactor continuously or periodically and the fine particles in it can be thoroughly separated and returned to the reactor.

The apparatus according to the invention, i.e. the so called rotary feeder, contains a rotor having substantially axial blades, between the blades of which pockets opening towards the ends of the rotor are formed, a housing encompassing the rotor and having an inlet and an outlet for the supply material, and drive means for rotating the rotor so that the pockets communicate alternately with the inlet and the outlet.

The apparatus according to the invention is characterized in that in the housing there is disposed an inlet and an outlet for air in order to cause a flow of air through the pocket after said pocket has passed the inlet of the material.

The invention is explained in more detail in the following with reference to the accompanying drawings in which FIG. 1 is a vertical section of a preferred embodiment according to the invention;

Figure 1:
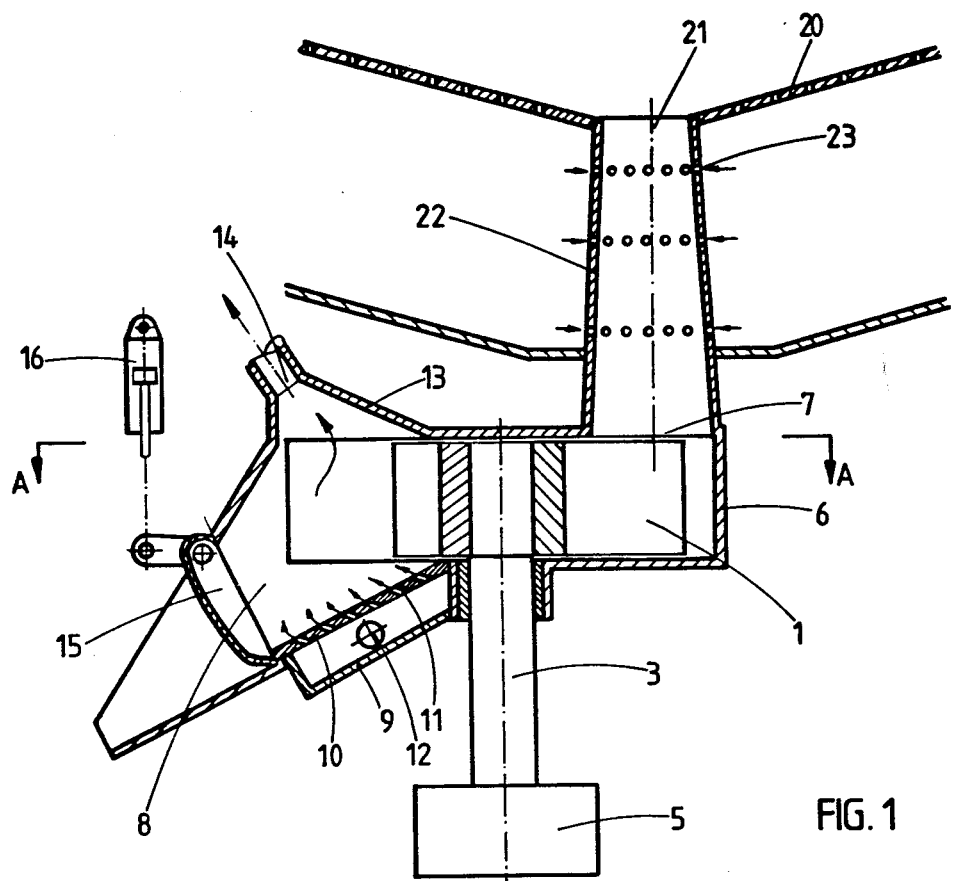
Figure 2:
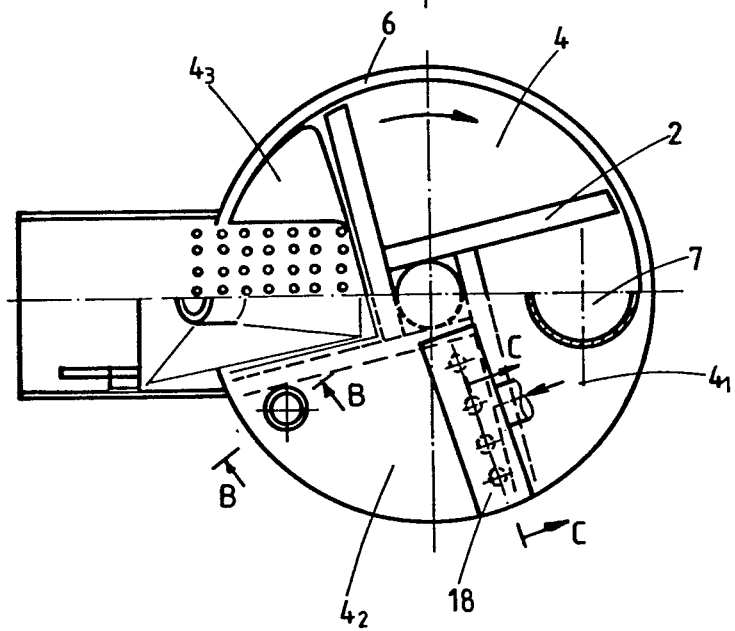
FIG. 2 is a sectional plan view of the apparatus taken along line A—A of FIG. 1.
Figure 3:
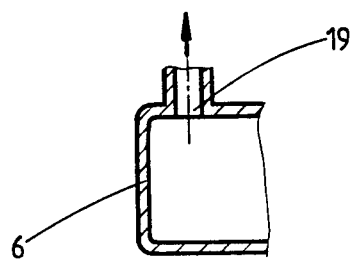
FIG. 3 is a sectional view of a detail of the apparatus taken along line B—B of FIG. 2.
Figure 4:
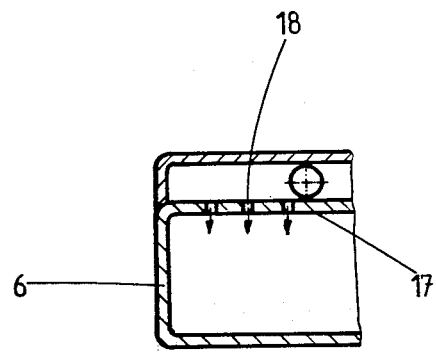
FIG. 4 is a sectional view of another detail of the apparatus taken along line C—C of FIG. 2.

In the following, reference 1 is a rotor provided with blades 2 and attached to an upright shaft 3. Pockets 4 which open towards the ends of the rotor are formed between the rotor blades. The rotor is driven by drive means 5. The rotor is encompassed, in a manner not explained here, by a water cooled housing 6 having an inlet 7 and an outlet 8 for the supply material. In one end 9 of the housing which in the present embodiment forms the bottom plate of the apparatus, there is disposed a part 10 having orifices 11 which are in communication with the air inlet 12 so that air can be conducted below the perforated area. In another end 13 of the housing which in the present embodiment forms the cover plate of the apparatus there is disposed an air outlet 14. In front of the outlet 8 there is a sluice valve 15 which is connected to drive means 16.

In the cover plate section 17 above the adjacent pocket of the rotor there are orifices 18 through which air can be conducted to the rotor pocket, and an outlet 19 for air.

The inlet of the material is connected to an opening 21 in a grid 20 of the fluidized bed reactor by means of a pipe 22 having several air inlets 23.

The operation principle of the apparatus is as follows:

The material discharged from a fluidized bed reactor is conducted through the pipe 22 connected to the opening 21 in the grid to the supply material inlet 7 of the rotary feeder. The material is cooled in the pipe by means of air fed in through inlets 23. The blowing of air prevents partly also the finely-divided material from getting into the rotary feeder. When the pocket 4 under the rotor is full, it moves, as the rotor rotates, to position $4_2$ shown by the arrow. By means of air conducted in through the orifices 18 in the cover plate and discharged through the outlet 19 an air flow through the pocket is created for primary separation of finely divided materials. Air is conducted to the next pocket $4_3$ below the perforated plate 10 and the air is discharged from the upper part of the rotary feeder through the opening 14. The flow of air causes the remaining finely-divided material to separate and the fines entrained by the air are conducted back to the reactor. The particle size of the material returned to the reactor is determined by the amount of air (the flow velocity).

When the air blast in pocket $4_3$ is over, the sluice valve 15 is opened in such a manner that the coarse particles are discharged from the pocket.

The rotating motion of the rotor can be either continuous or periodical. Its velocity is determined according to the desired feed.

The structure of the rotary feeder can differ from the embodiment of the example. Thus the emptying of a rotor pocket can be caused to happen while it is in a position where no air blowing is carried out.

We claim:

1. A rotary feeder for separating coarse material from finely divided material produced in a fluidized bed reactor, discharging the coarse material and recirculating the finely divided material to the reactor, which comprises a rotor having a housing, an inlet for the material being fed into the rotor and a downwardly inclined conduit for the discharge of the coarse material from the reactor, valve means for opening and closing the conduit, the housing having a cover plate at one end and an inclined bottom plate having at its end an outlet for the coarse material, a part of said bottom plate having first orifices, an inlet for air in communication with said first orifices, an outlet for air in said cover plate, the rotor having axial blades between which pockets are formed, which pockets communicate alternately with said inlet and said outlet for the material, as the rotor rotates, drive means for rotating the rotor, a portion of said cover plate having second orifices for the introduction of air and for the separation of fine material, and a second outlet for air whereby air is introduced into a pocket formed between the axial blades when said pocket during rotation of the rotor has moved over the inlet of the material.

2. A rotary feeder according to claim 1 wherein a sluice valve is disposed in the outlet of the supplied material.

3. A rotary feeder according to claim 1 wherein the outlet of the supplied material and the air inlet and air outlet are so arranged that they communicate with the same rotor pocket.

4. A rotary feeder according to claim 1, wherein the rotor has a shaft which rotor shaft is substantially vertical.

5. A rotary feeder according to claim 1 wherein its rotating motion is periodical so that the duration of a period in that motion corresponds to the angle of rotation of the rotor corresponding to the pitch of the rotor blades.

* * * * *